(12) United States Patent
Clark

(10) Patent No.: US 7,303,685 B2
(45) Date of Patent: Dec. 4, 2007

(54) POLYMER CONTROL SYSTEM

(76) Inventor: John W. Clark, 6991 6991 Peachtree Industial Blvd., Norcross, GA (US) 30092

( * ) Notice: Subject to any disclaimer, the term of this patent is extended or adjusted under 35 U.S.C. 154(b) by 292 days.

(21) Appl. No.: 11/255,636

(22) Filed: Oct. 21, 2005

(65) Prior Publication Data

US 2007/0090060 A1    Apr. 26, 2007

(51) Int. Cl.
*B01D 21/00* (2006.01)
(52) U.S. Cl. .................. 210/709; 210/91; 210/400; 210/401; 210/745; 210/783; 210/86; 700/271; 700/273
(58) Field of Classification Search .............. 210/709, 210/91, 400, 401, 745, 783, 86; 700/271, 700/273
See application file for complete search history.

(56) References Cited

U.S. PATENT DOCUMENTS 5,380,440 A * 1/1995 Chipps ....................... 210/709

* cited by examiner

Primary Examiner—Walter D. Griffin
Assistant Examiner—Tamiko Toye
(74) Attorney, Agent, or Firm—Vivian L. Steadman; Harry I. Leon

(57) ABSTRACT

A feedback control for a polymer dispensing system, which otherwise continuously adjusts the polymer feedrate so as to keep the measured streaming current of filtrate from a sludge dewatering process at one predetermined setpoint. The feedback control includes a video camera focused on sludge as it trails behind plows on a dewatering belt, a video image processing system for converting the video signal into single numbers known as "camera readings", and a computer programmed both to compare them with a "camera reading" setpoint and to determine whether the filtrate charge is more positive or more negative than it normally is whenever the "camera reading" deviates from its setpoint by a threshold amount. A controller, activated by the computer, incrementally resets the polymer feedrate in such a direction as to restore the normal cationic charge of the filtrate. The feedback control uses the streaming current value measured immediately after each "camera reading" excursion to update the streaming current setpoint.

4 Claims, 3 Drawing Sheets

POLYMER CONTROL SYSTEM

BACKGROUND OF THE INVENTION

The present invention relates to apparatus for detecting the degree of wetness of sludge as it is being dewatered on a gravity belt thickener, belt press or the like and to controls, based on streaming current monitoring technology, for adjusting polymer dosage, on-line, in wastewater treatment processes.

In the prior art, optical devices, including a video camera focused on a fixed portion of a sludge dewatering belt, have been used to identify the exact moment at which the wetline on the belt crosses a given point. Typically, this point is located after the last row of dewatering plows; and the movement of the wetline into the camera's viewing range signals that there has been a sudden change-in process conditions causing the sludge to become wet.

Previously, the video camera has been used to track visually the onset of sludge dewatering systems washouts. When the sludge cake becomes wet, there are less distinct trails behind the plows; and the camera image becomes more black. Such washouts can be related to a certain distinctive pattern in which "camera readings" in processed video signals drop precipitously over time. Generation of such "camera readings" entails the use of a video monitoring system complete with a PC (personal computer), video input card, and suitable software, such as the Polytracker™ program available commercially from Chemtrac Systems, Inc. of Norcross, Ga. The latter software divides the pixels of the camera's image into 1 of 2 bins—black and white. A "pixel threshold" programmed into this software establishes the value by which the pixels are split into one or the other of the two bins. Calibration of the "camera reading" is achieved by adjusting the "pixel threshold," setting until the "camera reading" registers around 50 (on a scale of 0 to 100) at the same time the sludge cake exhibits an optimum degree of dryness, exposing sizeable portions of the dewatering belt because of good sludge separation behind the plows.

Unfortunately, video image processing technology by itself is not sufficiently sensitive to be of use in controlling polymer dosage in dewatering systems automatically. A significant underfeed of polymer, for example, initially causes the "camera readings" to change only slowly. As the sludge dryness decreases and the sludge closes in behind the plows, the "camera readings" first start to climb towards the upper 50's and 60's, still relatively close to the usual "camera reading" setpoint of 50. But if the belt completely washs out, the "camera readings" suddenly reverse direction and drop towards 0—the same as if the sludge had become excessively dry—even though the video image has gone all black and no white from the belt is showing through. In the case of a washout, this precipitous drop occurs because of an adjustment which a light compensation feature of the video camera makes, actually shifting the pixels being measured toward the lower (white) threshold. The resultant pattern while useful in helping an operator to initially set a minimum polymer dosage for a given set of process conditions, cannot be used to accurately detect, on-line, which direction polymer dosage may need to be adjusted in response to changing process conditions.

Conveniently, output from the streaming current monitor (SCM), modified with larger flow paths and an automated cleaning system to help prevent plugging and fouling of the SCM sensor in the wastewater environment, can be related to polymer dosage. Employing a pair of electrodes to detect a current which is generated when a solution of electrically charged particles is hydraulically sheared by a piston as it reciprocates within a cylinder on which the electrodes are mounted, as disclosed in U.S. Pat. Nos. 4,769,608 and 5,119,029, the SCM measures the net ionic and colloidal surface charge, whether positive or negative, in the sample being tested. Used to measure on-line the streaming current, or charge, of filtrate captured as the sludge is being dewatered, the streaming current monitor responds rapidly to changes in the filtrate composition. Most polymers used in sludge dewatering are positively charged (cationic), and most municipal wastewater solids requiring dewatering are negatively charged (anionic). If the SCM detects a higher than normal cationic charge in the filtrate, then it is likely that excess polymer is being fed.

In the prior art, signals from SCMs were fed to controllers to make changes in the polymer dosage so as to maintain the charge of the filtrate at a predetermined setpoint. It was left up to individual operators to determine both what the initial streaming current setpoint should be and when it required adjustment. In some situations, the high frequency of required setpoint adjustments—necessitated because of certain changes in sludge composition and even changes in flow rates, especially when short retention times were involved—led operators to question the effectiveness of using streaming current monitoring technology in wastewater treatment plants (WWTPs).

SUMMARY OF THE INVENTION

The object of the present invention is to provide an improved method and apparatus for readjusting, on-line, the rate at which polymer is fed into wastewater upstream of a gravity belt thickener, belt press or the like in such a way as to achieve optimum dewatering, whether it be measured in terms of cake dryness, filtrate clarity, volume processed, or some combination of these parameters, at the lowest possible-polymer cost.

A further object of the present invention is to provide such an apparatus for re-adjusting the minimum polymer dosage for a sludge dewatering system which is subject to wide fluctuations over time in the sludge makeup, flow rate, or percentage of solids.

A still further object of the present invention is to provide such an apparatus which can respond to changes in the degree of wetness of the sludge cake before drastic events occur and in so responding, increase the polymer dosage when a streaming current monitor shows a likely underfeed of polymer and decrease the polymer dosage when the SCM shows a likely overfeed of polymer.

In accordance with the present invention, there is provided an improved feedback control for a polymer dispensing system, which otherwise would continuously make adjustments to the polymer feedrate in such a way as to keep the measured streaming current of filtrate from a sludge dewatering process at a predetermined setpoint. The feedback control includes a video camera focused on a portion of the sludge cake as it trails behind dewatering plows on a gravity belt thickener or the like, a video image processing system for converting the signal from the video camera into a single number "camera reading", a computer programmed to activate a controller which incrementally resets the rate at which polymer is being fed to the wastewater flow upstream of the belt thickener whenever the "camera reading" goes either above or below its setpoint by a predetermined threshold amount, and means for establishing a new streaming current setpoint automatically once optimum sludge dewatering conditions have been restored, as evidenced by the "camera reading" returning to a value within the threshold of the "camera reading" setpoint. In addition, the computer is programmed to determine whether the filtrate charge, as the "camera reading" begins an excursion outside its acceptable range, is more positive or more negative than the normal cationic charge in the filtrate, as measured by the SCM, and to activate the controller to incrementally decrease the polymer feedrate when the filtrate charge is more positive and increase this feedrate when the filtrate charge is more negative.

In the preferred embodiment, the controller can also be activated at preset intervals to incrementally decrease the polymer feedrate until the "camera reading" falls outside the acceptable range (which corresponds to the "camera reading" setpoint plus or minus the threshold amount). Once this "camera reading" excursion has been induced, the controller incrementally increases the polymer feedrate to bring the "camera reading" back into the acceptable range; and the new streaming current setpoint is established by grabbing the streaming current value measured immediately after each such "camera reading" excursion.

DETAILED DESCRIPTION OF THE PREFERRED EMBODIMENT

Figure 1:
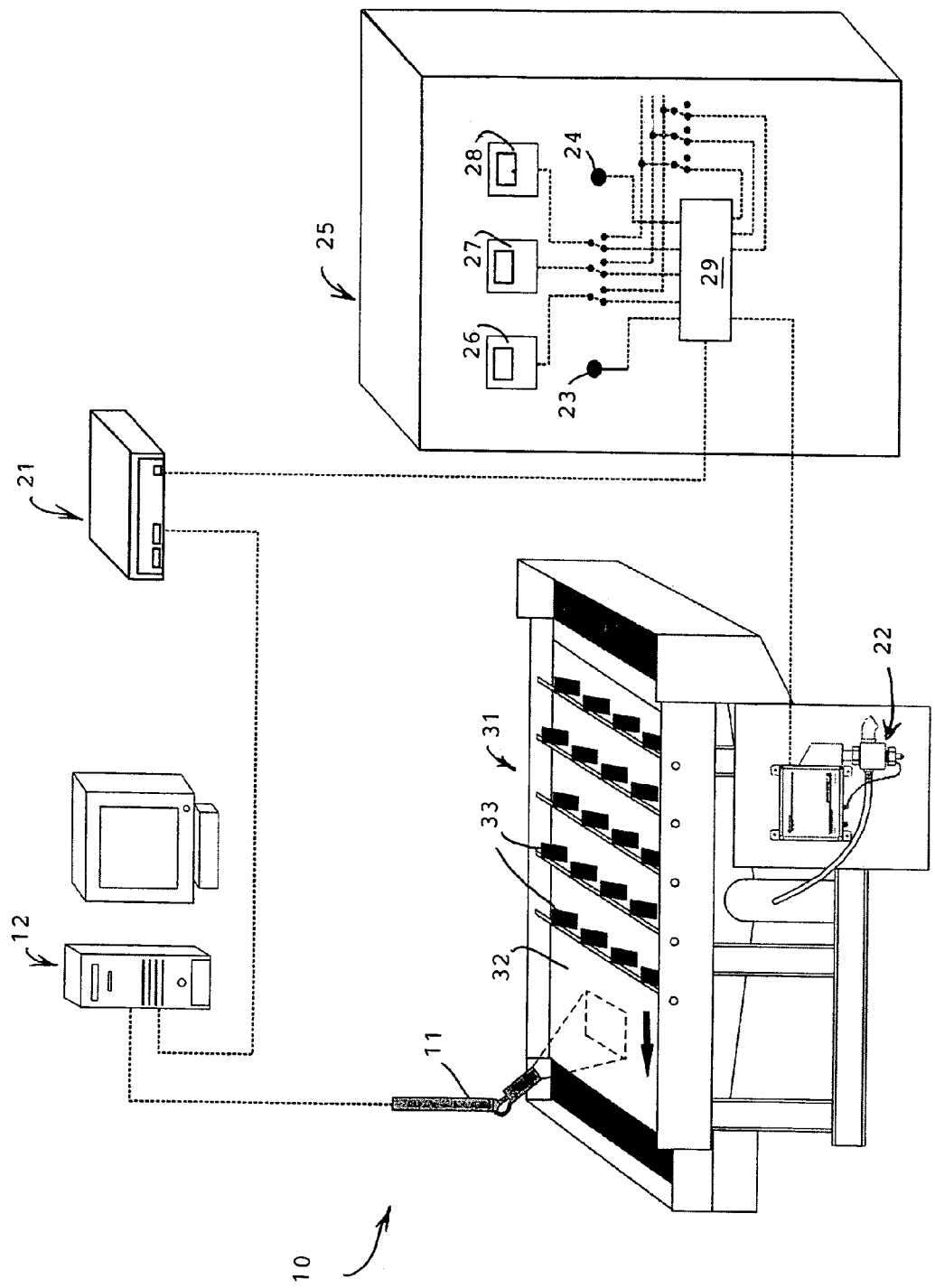
FIG. 1 is a side elevation view, shown partly in schematic, of an apparatus for practicing the method according to the present invention, a gravity belt thickener being shown for illustrative purposes only and forming no part of the invention.

Referring to the drawings, the improved apparatus according to the present invention is denoted generally by the reference numeral 10. The apparatus 10 comprises a video camera 11 which is focused on a fixed portion of a gravity belt thickener 31, a Web access controller 21, and a streaming current monitor 22 (FIG. 1). During operation, the signal from the video camera 11, at any given moment of time, is related to a single number known as the "camera reading"; facilitating interpretation of the camera image.

In the preferred embodiment, a video monitoring system including a PC computer 12, a video input card, Polytracker™ software, and an analog output card is used to process the video signal and send 4-2.0 milliamp signals back to the Web access controller 21.

Programmed into the Polytracker™ software is a "pixel threshold" which establishes the value by which the pixels of the camera's image are divided into one or the other of two bins—black and white. Calibration of the "pixel threshold" is performed each time the video camera 11 is turned on in order to establish a new "camera reading" setpoint once the sludge cake looks optimum, and sizeable portions of the dewatering belt 32 downstream of thickener plows 33 are exposed. Ideally, the "camera reading" setpoint is around 50.

When the sludge cake deteriorates, becoming wet, there are less distinct trails behind the plows 33; and the camera image becomes more black. If the thickener 31 were to wash out completely, the camera image would become all black and there would be no white from the belt 32 showing through.

To avoid such washouts, the 4-20 milliamp signal produced by the video-monitoring system is fed into the controller 21 which in turn signals a pump to increase the polymer feedrate in preset increments. The polymer feedrate is then increased until normal operating conditions on the belt-thickener 31 have been recovered or else the maximum number of incremental increases in the polymer feedrate has been reached and the system then reverts to manual control.

Figure 2:
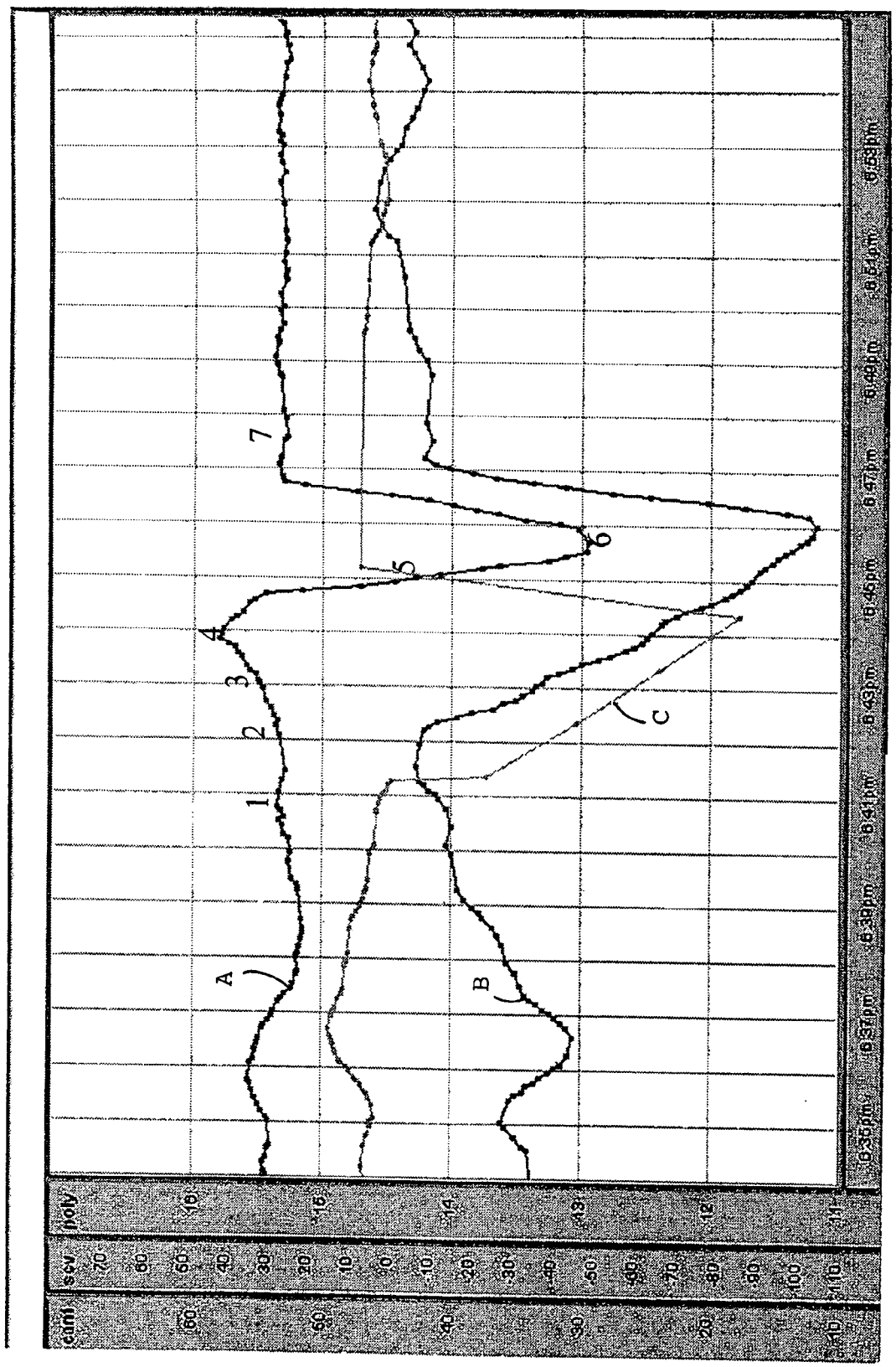
FIG. 2 is a composite graph on which have been plotted outputs from the apparatus according to FIG. 1, as well as the output from a polymer feed pump, the plots including signals from a streaming current monitor and a video camera used to measure the charge of filtrate and index the dryness of sludge cake, respectively, in a sludge dewatering process in which the pump supplies polymer to enhance the formation of solids suitable for dewatering.
Figure 3:
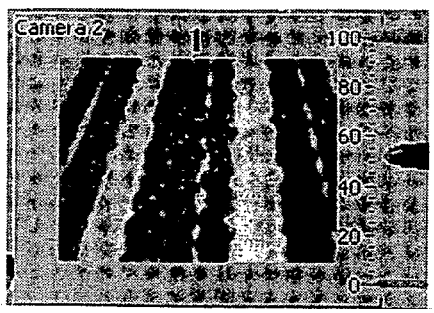
FIG. 3 shows a series of photographic images recorded at various moments by the video camera during the sludge dewatering process graphed in FIG. 2, the bold number centered above each photographic image corresponding to the moment of time indicated by the same bold number imprinted proximate with the "camera reading" plot on the graph.
Figure 3:
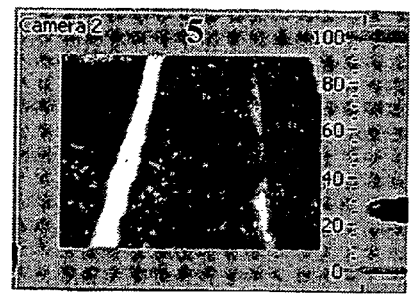
Figure 3:
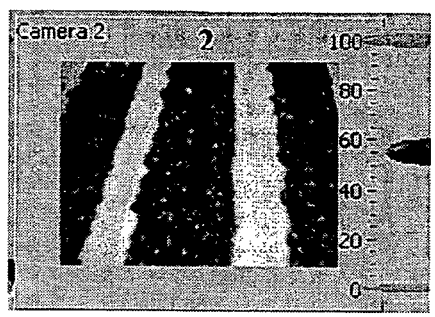
Figure 3:
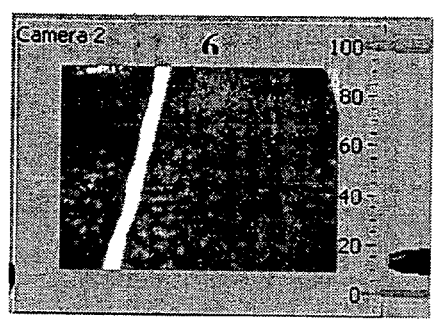
Figure 3:
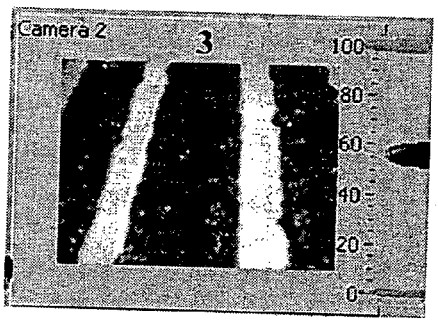
Figure 3:
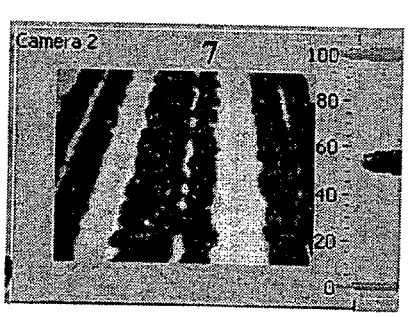
Figure 3:
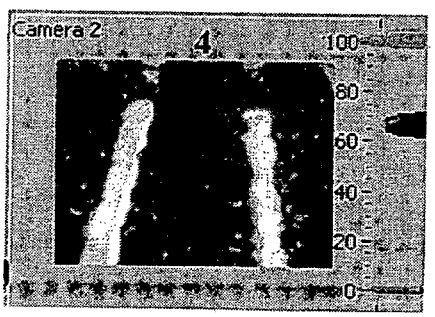

At the same time the video signal is being processed so as to index the condition of the sludge on the belt 32, the streaming current monitor 22 is tracking the streaming current of filtrate captured from the gravity belt thickener 31 and feeding an electronic signal proportional to the streaming current into the controller 21 via I/O nodes 29. The streaming current value, which is representative of the charge of the filtrate, is much more sensitive to changes in process conditions—specifically, variations in either the polymer feedrate or the sludge feedrate—than is the "camera reading". An example of the differences can be seen in FIG. 2, a strip chart-type record of the "camera reading" A, streaming current B, and polymer feedrate C from an actual sludge dewatering process. As illustrated there, the streaming current B responds with about 1 min. lag time to a rapid drop in the polymer feedrate C, whereas the "camera reading" A lags the polymer feedrate by over 3 minutes for the same response period. Moreover, the "camera reading" A actually climbs upwardly between time points 1 through 4—the 3 minute interval when the polymer feedrate C is plunging downwardly.

Because a washout can occur suddenly, well before the "camera reading" makes its downward plunge, the controller 21 is programmed to continuously compare the "camera reading" values with a "camera reading" setpoint and at the same time determine whether the filtrate charge is more positive or more negative the normal cationic charge, that is, the value of the filtrate charge when the sludge dewatering process is performing optimally. Whenever the "camera reading" deviates from its setpoint by a predetermined threshold amount, the controller 21 immediately resets the polymer feedrate in such a direction as to restore the normal cationic charge of the filtrate. During a pending washout, for example, the controller 21 must signal the polymer feed pump to increase its output, consistent with the facts that most polymers used in sludge dewatering are positively charged (cationic) and most municipal solids requiring dewatering are negatively charged (anionic).

On the other hand, when the sludge dewatering process is impacted by reductions in the sludge feed rate, leading to excess polymer being present in the filtrate if the polymer feed pump output were not adjusted, the controller 21 signals the polymer feed pump to decrease its output.

The actual signal to the polymer feed pump at any given time represents a combining of a flow setpoint value, which is calculated on the basis of a linear relationship between the polymer feedrate and the current sludge feedrate, and an adjustment determined by the width of a streaming current setpoint deadband. The latter establishes the range over which the controller 21, in signaling the polymer feed pump, can add to or subtract from the flow setpoint, as the controller constantly adjusts the polymer feedrate to keep the filtrate's streaming current value at the streaming current setpoint.

The streaming current setpoint itself is determined by first manually optimizing the sludge dewatering process. Once optimum conditions exist, the streaming current value at that point becomes the initial streaming current setpoint, as well as the "normal cationic charge". Subsequently, as the dewatering process proceeds, the streaming current setpoint can be changed either manually or automatically; but the "normal cationic charge" preferably remains a fixed value. The width of the streaming current setpoint deadband, on the other hand, is set on the basis of the demand for polymer; the more variable this demand is, the larger this deadband needs to be.

As a guidepost to making automatic adjustments to the streaming current setpoint, the controller 21 uses the "camera reading" setpoint—an ideal "camera reading" value which correlates to optimum sludge conditions on the belt 32. If the actual "camera reading" values go either above or below this "camera reading" setpoint by the predetermined threshold amount, both the polymer feedrate and the streaming current setpoint can belt automatically adjusted in an attempt to get the "camera reading" back to within an acceptable range of the "camera reading" setpoint. Increased sludge feed to the belt 32, which is associated with "camera reading" changes because there may be more or less solids on the belt, may necessitate the operator manually establishing a new "camera reading" setpoint, as is required each time the video camera 11 is turned on.

In the preferred embodiment, the controller 21 is also programmed to automatically find the most optimum streaming current setpoint. This task is accomplished by first decreasing the polymer feedrate until the "camera reading" falls outside the acceptable range (which is the "camera reading" setpoint plus or minus the deadband setting). Once this "camera reading" excursion occurs, the controller 21 signals the polymer feed pump to increase its output so as to bring the "camera reading" value back into the acceptable range. And upon the "camera reading" value re-entering the acceptable range, a new streaming current setpoint is established by grabbing the streaming current value then being measured.

The controller 21, with is at the heart of the apparatus 10 and works much like a compact SCADA system to provide overall supervisory control, is integrated with I/O nodes typically installed in a control panel 25 having run/stop and manual/auto switches 23, 24. The I/O nodes 29 are used to bring in analog and digital signals such as the sludge and polymer feed pump settings and the run status of the belt 32 and display them in windows 26, 27, 28. The I/O nodes 29 also provide analog and digital signals for controlling the polymer feedrate, the sludge pump speed, and maintenance accessories for the streaming current sensor of the monitor 22, preferably a Dura-Trac//™ available from Chemtrac.

It is claimed:

1. A method of automatically adjusting polymer feedrate in a sludge dewatering process in which filtrate captured from a gravity belt thickener and generated when the process is operating under optimum conditions exhibits a normal cationic charge measurable, as is the filtrate's charge generally, with a streaming current monitor, which comprises:

(a) converting images from a video camera focused on a fixed portion of the thickener's belt into single numbers known as "camera readings";
   (b) simultaneously monitoring the streaming current of filtrate from the dewatering process;
   (c) determining, whenever the "camera readings" begin to deviate from a "camera reading" setpoint by a predetermined threshold, whether the filtrate charge is more positive than the normal cationic charge;
   (d) incrementally resetting the polymer feedrate in such a direction as to restore the normal cationic charge of the filtrate; and
   (e) updating the streaming current setpoint which is used to adjust the polymer feedrate except during a "camera reading" excursion when the "camera readings" deviate from the "camera reading" setpoint by at least the predetermined threshold, the updated streaming current setpoint being set equal to the streaming current value measured immediately after each such "camera reading" excursion.

2. The method according to claim 1 which further comprises incrementally resetting the polymer feedrate at preset intervals in such a way as to induce a "camera reading" excursion in which the "camera reading" deviates from the "camera reading" setpoint by the predetermined threshold amount.

3. The method according to claim 1 which further comprises incrementally decreasing the polymer feedrate at preset intervals in order to induce a "camera reading" excursion in which the "camera reading" deviates from the "camera reading" setpoint by the predetermined threshold amount and then immediately increasing the polymer feedrate in increments in order to end the "camera reading" excursion before a washout of the thickener's belt can occur.

4. A method of automatically adjusting polymer feedrate in a sludge dewatering process in which filtrate is captured from a dewatering belt, which comprises:

(a) converting images from a video camera focused on a fixed portion of the dewatering belt into single numbers known as "camera readings";
   (b) simultaneously monitoring the streaming current of the filtrate;
   (c) converting the filtrate's measured streaming current values to cationic charge values;
   (d) continuously comparing the "camera readings" with a "camera reading" setpoint;
   (e) adjusting the polymer feedrate continuously so as to maintain the filtrate's streaming current values within a streaming current setpoint deadband, except when the "camera reading" deviates from the "camera reading" setpoint by at least a predetermined threshold amount;
   (f) incrementally resetting the polymer feedrate, when the "camera reading" so deviates, in such a direction as to restore the filtrate's normal cationic charge, as exhibited by the filtrate when the process is operating under optimum conditions; and
   (g) updating the streaming current setpoint by setting it equal to the streaming current value measured immediately upon the "camera readings" coming to within the threshold amount of the "camera reading" setpoint after an excursion outside of its threshold.

* * * * *